US011277013B2

(12) United States Patent
Watanabe et al.

(10) Patent No.: US 11,277,013 B2
(45) Date of Patent: *Mar. 15, 2022

(54) POWER STORAGE SYSTEM HAVING A PLURALITY OF POWER STORAGE BLOCKS INTERCONNECTED IN PARALLEL AND CONTROL DEVICE (71) Applicant: Panasonic Intellectual Property Management Co., Ltd., Osaka (JP)

(72) Inventors: Tohru Watanabe, Gifu (JP); Kazufumi Nishikawa, Osaka (JP); Shinya Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

This patent is subject to a terminal disclaimer.

(21) Appl. No.: 16/617,563

(22) PCT Filed: Apr. 26, 2018

(86) PCT No.: PCT/JP2018/016899
§ 371 (c)(1),
(2) Date: Nov. 27, 2019

(87) PCT Pub. No.: WO2018/225417
PCT Pub. Date: Dec. 13, 2018

(65) Prior Publication Data
US 2020/0169105 A1 May 28, 2020

(30) Foreign Application Priority Data

Jun. 8, 2017 (JP) .............................. JP2017-113752

(51) Int. Cl.
*H02J 7/00* (2006.01)
*H01M 10/48* (2006.01)

(52) U.S. Cl.
CPC ......... *H02J 7/00302* (2020.01); *H01M 10/48* (2013.01); *H02J 7/00304* (2020.01); *H02J 7/00306* (2020.01)

(58) Field of Classification Search
CPC .................................................. H02J 7/00302
(Continued)

(56) References Cited

U.S. PATENT DOCUMENTS 8,583,389 B2 11/2013 Aoshima et al.
10,361,467 B2 7/2019 Kubo
(Continued)

FOREIGN PATENT DOCUMENTS

JP 2004-215459 A 7/2004
JP 2010-088202 4/2010
(Continued)

OTHER PUBLICATIONS

International Search Report of PCT application No. PCT/JP2018/016899 dated Jun. 12, 2018.
(Continued)

Primary Examiner — Yalkew Fantu
(74) Attorney, Agent, or Firm — McDermott Will and Emery LLP (57) ABSTRACT In a power storage system, a management device calculates a state of power (SOP) of a whole of a plurality of power storage blocks connected in parallel based on an SOP of each of the plurality of power storage blocks to specify the calculated SOP of the whole for an upper limit level of power or current for at least one of charging and discharging controlled by a power converter. When at least one of a plurality of switches is turned off to disconnect at least one (30) of the plurality of power storage blocks, the management device calculates an SOP of a whole of the remaining power storage blocks based on a deviation in current
(Continued)

between each of the remaining power storage blocks to determine an upper limit level of power or current flowing into the power converter.

7 Claims, 5 Drawing Sheets

(58) Field of Classification Search
USPC .......................................................... 320/127
See application file for complete search history.

(56) References Cited

U.S. PATENT DOCUMENTS

| | | | |
|---|---|---|---|
| 11,043,821 B2 | 6/2021 | Nishikawa et al. | |
| 2004/0138785 A1 | 7/2004 | Emori et al. | |
| 2013/0293198 A1 | 11/2013 | Nakashima et al. | |
| 2014/0103933 A1 | 4/2014 | Gibbs | |
| 2015/0258897 A1 | 9/2015 | Okada et al. | |
| 2015/0364797 A1 | 12/2015 | Inaba et al. | |
| 2017/0126052 A1 | 5/2017 | Toki | |
| 2018/0090962 A1* | 3/2018 | Cha | G01R 31/3842 |
| 2019/0346511 A1* | 11/2019 | Lim | G01R 31/3842 |
| 2020/0161875 A1* | 5/2020 | Nishikawa | H02J 3/32 |
| 2020/0176829 A1 | 6/2020 | Nishikawa et al. | |
| 2021/0129683 A1 | 5/2021 | Yamasaki et al. | |
| 2021/0168964 A1 | 6/2021 | Nakaya | |

FOREIGN PATENT DOCUMENTS

| | | |
|---|---|---|
| JP | 2014-193040 A | 10/2014 |
| JP | 2017-028801 A | 2/2017 |
| WO | 2014/128941 A1 | 8/2014 |
| WO | 2015/189983 A1 | 12/2015 |

OTHER PUBLICATIONS

Notice of Allowance issued in U.S. Appl. No. 16/617,556, dated Mar. 4, 2021.
Non-Final Office Action issued in U.S. Appl. No. 16/637,923, dated Sep. 2, 2021.
Notice of Allowance issued in U.S. Appl. No. 16/637,923, dated Nov. 23, 2021.
International Search Report of PCT Application No. PCT/JP2018/016898 dated May 29, 2018.
International Search Report of PCT Application No. PCT/JP2018/029194 dated Sep. 11, 2018.

* cited by examiner

POWER STORAGE SYSTEM HAVING A PLURALITY OF POWER STORAGE BLOCKS INTERCONNECTED IN PARALLEL AND CONTROL DEVICE

CROSS-REFERENCE TO RELATED APPLICATIONS

This application is a U.S. national stage application of the PCT International Application No. PCT/JP2018/016899 filed on Apr. 26, 2018, which claims the benefit of foreign priority of Japanese patent application 2017-113752 filed on Jun. 8, 2017, the contents all of which are incorporated herein by reference.

TECHNICAL FIELD

The present invention relates to a power storage system in which a plurality of power storage blocks are interconnected in parallel. The present invention also relates to a management device.

BACKGROUND ART

Recently, power storage systems have been widespread and are used for peak shift, backup, frequency regulation (FR), and other purposes. A huge power storage system is constructed by, for example, connecting in parallel a plurality of power storage blocks each composed by connecting in series a plurality of power storage modules. In this specification described hereinafter, it is assumed that the power storage block is a power storage rack including a plurality of power storage modules stacked in a rack.

If an abnormality has occurred in one of a plurality of power storage racks connected in parallel, the power storage system often disconnects the abnormal power storage rack and decreases an upper limit of the electric power controlled by a power conditioner according to a number of the remaining power storage racks to continue operation (refer to PTL 1, for example).

CITATION LIST

Patent Literature

PTL 1: Unexamined Japanese Patent Publication No. 2010-88202

SUMMARY OF THE INVENTION

In the case described above, if a large deviation in electric current has occurred between the remaining power storage racks, the electric power of any of the power storage racks may exceed an upper limit put on the electric power for each of the power storage racks. If this happens, the power storage racks can be sequentially disconnected, resulting in a shutdown of the entire power storage system.

The present invention has been accomplished in view of the problem above, and it is an object of the present invention to provide a power storage system capable of continuing stable operation even if at least one of a plurality of power storage blocks connected in parallel is disconnected from the system.

A power storage system according to an aspect of the present invention, accomplished to solve the challenge described above, includes a plurality of power storage blocks connected in parallel, a power converter (power conditioning system (PCS)) converting direct current (DC) power discharged from the plurality of power storage blocks into alternating current (AC) power to output the AC power to a power system (power grid) or a load and converting AC power sent from the power system into DC power to charge the plurality of power storage blocks, a plurality of switches interposed between the plurality of respective power storage blocks and the power converter, and a management device calculating a state of power (SOP) of a whole of the plurality of power storage blocks based on an SOP of each of the plurality of power storage blocks to specify the calculated SOP of the whole for an upper limit level of power or current for at least one of charging and discharging controlled by the power converter. When at least one of the plurality of switches is turned off to disconnect at least one of the plurality of power storage blocks, the management device calculates an SOP of a whole of the remaining power storage blocks based on a deviation in current between each of the remaining power storage blocks to determine an upper limit level of power or current flowing into the power converter.

A power storage system according to the present invention is able to continue stable operation even if at least one of a plurality of power storage blocks connected in parallel is disconnected from the system.

DESCRIPTION OF EMBODIMENT

Figure 1:
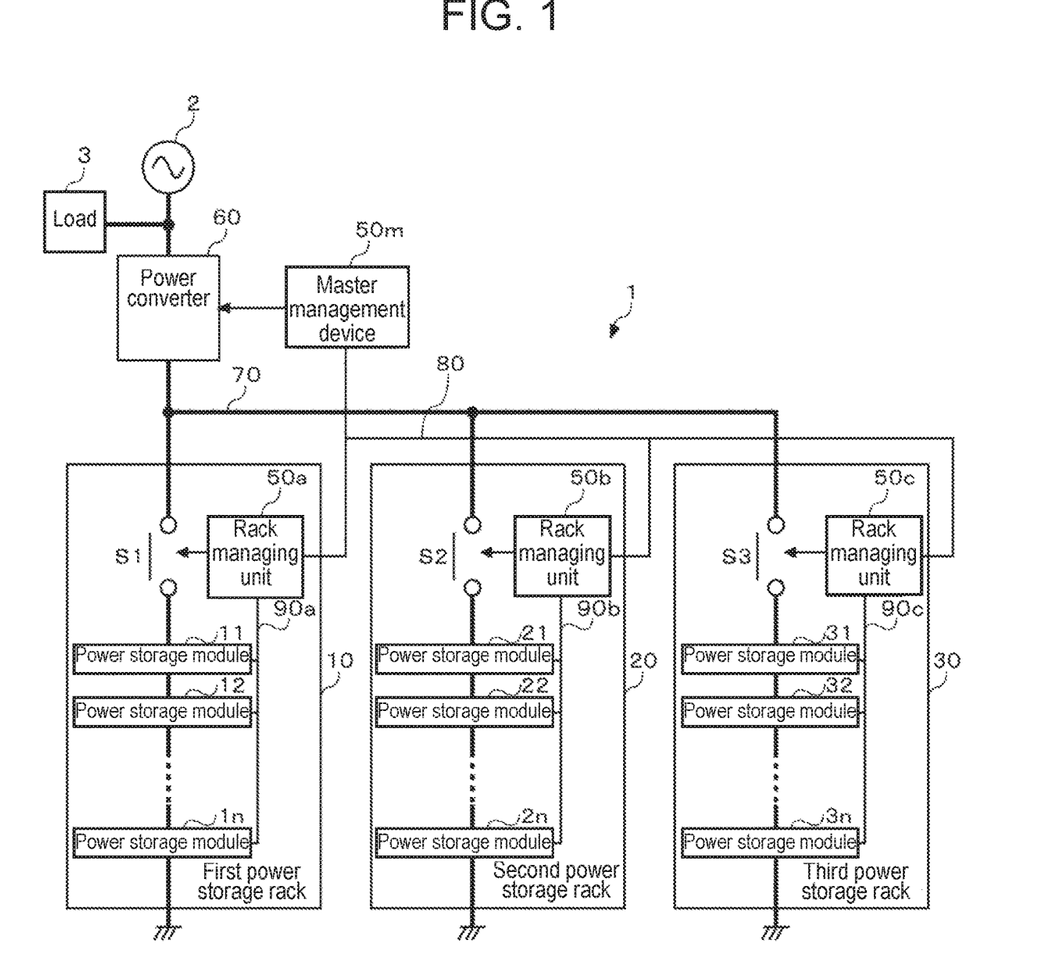
FIG. 1 is a drawing illustrating a configuration of a power storage system according to an exemplary embodiment of the present invention.

FIG. 1 is a drawing illustrating a configuration of power storage system 1 according to an exemplary embodiment of the present invention. Load 3 is connected to a distribution line between power storage system 1 and power system (power grid) 2. Power storage system 1 includes a plurality of power storage racks connected in parallel, power converter (power conditioning system (PCS)) 60, and master management device 50m. FIG. 1 illustrates an example of three power storage racks (first power storage rack 10, second power storage rack 20, and third power storage rack 30) connected in parallel with power converter 60.

Power converter 60 converts direct current (DC) power discharged from the plurality of power storage racks 10 to 30 into alternating current (AC) power to output it to power system 2 or load 3, and converts AC power sent from power system 2 into DC power to charge the plurality of power storage racks 10 to 30 connected in parallel. Power converter 60 can be made up of a typical power conditioner and includes a bidirectional inverter and a controlling circuit, as well as a bidirectional DC/DC converter if needed. In the description given hereinafter, it is, for example, assumed that power converter 60 includes the bidirectional DC/DC converter.

The bidirectional DC/DC converter is designed to control a current or voltage of the DC power charged into or discharged from the plurality of power storage racks 10 to 30. The bidirectional DC/DC converter, for example, provides constant current (CC)/constant voltage (CV) charging or CC/CV discharging. The bidirectional inverter converts DC power into AC power or converts AC power into DC power. In accordance with instructions from master management device 50m, the controlling circuit controls the bidirectional DC/DC converter and the bidirectional inverter.

First power storage rack 10 includes a plurality of power storage modules 11 to 1n connected in series, first rack managing unit 50a, and first switch S1. Power storage modules 11 to 1n each include a plurality of cells connected in series or series and parallel and a monitoring circuit. Each of the cells may be a lithium ion battery cell, a nickel hydride battery cell, an electric double layer capacitor cell, or a lithium ion capacitor cell, for example. It is assumed hereinafter that the cells are lithium ion battery cells, for example.

The monitoring circuit in each of power storage modules 11 to 1n detects voltages, currents, and temperatures of the plurality of cells in each of power storage modules 11 to 1n. The monitoring circuit sends the detected voltages, currents, and temperatures of the cells to first rack managing unit 50a via in-rack communication line 90a. The communication between each of the monitoring circuits and first rack managing unit 50a may be, for example, serial communication conforming to RS-485 specifications. The monitoring circuits may be connected to first rack managing unit 50a through wireless communication or communication over a power line.

First switch S1 is interposed between power line 70 connected to power converter 60 and the plurality of series-connected power storage modules 11 to 1n. First switch S1 may be, for example, a mechanical relay or a semiconductor switch. In the description given hereinafter, it is assumed that the first switch is, for example, a general-purpose electromagnetic relay. The electromagnetic relay is a switch that is controlled to switch a contact between close and open by letting a current flow through a coil.

First rack managing unit 50a is composed of hardware and software resources working together. The hardware resource may be a microcomputer, a digital signal processor (DSP), a field programmable gate array (FPGA), another large scale integration (LSI) circuit, or an analog element. The software resource may be a program such as firmware. First rack managing unit 50a receives voltages, currents, and temperatures of the cells from the monitoring circuits of power storage modules 11 to 1n via in-rack communication line 90a.

First rack managing unit 50a estimates a state of charge (SOC) and a state of health (SOH) of the cells based on the received voltages, currents, and temperatures of the cells. The SOC and the SOH of the cells may be estimated by the monitoring circuits of power storage modules 11 to 1n.

The SOC can be estimated by a current integration method or an open circuit voltage (OCV) method. The SOH is specified by a ratio of present full charge capacity to initial full charge capacity. This value decreases as degradation increases. The SOH may be determined by measuring cell capacity through fully charging or discharging. The SOH may be estimated by referring to a table of relationships between internal resistance and SOH values that are acquired in advance by an experiment or a simulation. The internal resistance can be estimated by dividing a voltage drop occurring when a constant current flows through a cell for a given time by the constant current. The internal resistance has the following relationship: the internal resistance decreases as the temperature rises and increases as the battery degrades.

First rack managing unit 50a estimates state of power (SOP) levels for charging and discharging of first power storage rack 10. An SOP of first power storage rack 10 indicates a maximum amount of electricity that is allowed to be charged into or be discharged from first power storage rack 10. An SOPc for charging can be determined by multiplying maximum charge current Ic that satisfies a condition of not exceeding upper limit voltage (full charge voltage) Vmax of first power storage rack 10 by terminal voltage V of first power storage rack 10 (refer to Equations 1 and 2 below). Meanwhile, an SOPd for discharging can be determined by multiplying maximum discharge current Id that satisfies a condition of not falling below lower limit voltage (discharge termination voltage) Vmin of first power storage rack 10 by terminal voltage V of first power storage rack 10 (refer to Equations 3 and 4 below).

$$SOPc = IcV \quad \text{(Equation 1)}$$

$$Ic = (V\text{max} - E)/R \quad \text{(Equation 2)}$$

$$SOPd = IdV \quad \text{(Equation 3)}$$

$$Id = (E - V\text{min})/R \quad \text{(Equation 4)}$$

Where E is the electromotive force, and R is the internal resistance.

Electromotive force E depends on the SOC and increases as the SOC rises. The SOPc for charging is zero when first power storage rack 10 reaches upper limit voltage Vmax. The SOPd for discharging is zero when first power storage rack 10 reaches lower limit voltage Vmin.

First rack managing unit 50a may estimate the SOP by referring to a table of relationships between SOC and SOP values that are acquired in advance by an experiment or a simulation. The SOP calculated by Equation 1 or 3 shown above decreases along with a reduction in SOH. Thus, the present SOP can be estimated by multiplying an initial SOP identified by reference to the table and the present SOH together. The SOP of each of the power storage racks (a rack SOP) is not limited to values defined by Equations 1 and 3 shown above and may be equal to a maximum power rating of the rack. In this case, the rack SOP for discharging when each of the power storage racks terminates discharging (SOC=0%) is set to zero, and the SOP for discharging returns to a value equal to the maximum power rating of the rack when the SOC, for example, gets to 2%. The rack SOP for charging when each of the power storage racks is fully charged (SOC=100%) is set to zero, and the SOP for charging returns to the value equal to the maximum power rating of the rack when the SOC, for example, gets to 98%. If the method of charging is pseudo CC/CV, the SOP for charging may gradually decrease from the maximum power rating of the rack to a small value.

First rack managing unit 50a is connected with master management device 50m, second rack managing unit 50b of second power storage rack 20, and third rack managing unit 50c of third power storage rack 30 through inter-rack communication line 80. Communication via inter-rack communication line 80 may be conducted using a communication scheme conforming to specifications of RS-485, Ethernet (registered trademark), or a controller area network (CAN), for example.

First rack managing unit 50a sends monitoring data on first power storage rack 10 to master management device 50m via inter-rack communication line 80. In this exemplary embodiment, the monitoring data sent to master management device 50m includes at least a value of the current flowing through first power storage rack 10 and the SOP of first power storage rack 10.

Second and third power storage racks 20 and 30 are similar in configuration and operation to first power storage rack 10, and hence a description of them is omitted.

Master management device 50m is composed of hardware and software resources working together. The hardware resource may be a microcomputer, a DSP, an FPGA, another LSI circuit, or an analog element. The software resource may be a program such as firmware. Master management device 50m communicates with rack managing units 50a to 50c via inter-rack communication line 80 and thereby manages the plurality of power storage racks 10 to 30. Master management device 50m transmits control signals to the controlling circuit of power converter 60. Master management device 50m may be configured to establish external communication with a management device of a system operator and/or a management device of a utility power system operator (both not shown).

Master management device 50m calculates the SOP of a whole of the plurality of power storage racks 10 to 30 connected in parallel (hereinafter referred to as a system SOP). The system SOP can be calculated by (Equation 5) shown below.

System SOP=Minimum rack SOP*(Total rack current/Maximum rack current)   (Equation 5)

Minimum rack SOP is a minimum value of the SOP values of the plurality of power storage racks 10 to 30. The total rack current is a total of values of currents flowing through the plurality of respective power storage racks 10 to 30. The maximum rack current is a largest value of the values of the currents flowing through the plurality of power storage racks 10 to 30. If the SOP and current values of the plurality of power storage racks 10 to 30 are ideally identical values respectively, the system SOP is a value of the multiplication product of the rack SOP and a number of the parallel-connected racks (3 in the example of FIG. 1). In contrast to this case, along with an increase in current deviation among the plurality of power storage racks 10 to 30, the system SOP decreases. In Equation 5 shown above, [Minimum rack SOP] may be replaced with [SOP of rack having minimum value in (rack current/rack SOP)]. If the currents of the power storage racks are zero or small, the system SOP can be estimated by parameters (internal resistance, wiring resistance, etc.) that determine a ratio of the current deviation.

The bidirectional DC/DC converter of power converter 60 can be controlled using the system SOP. The DC/DC converter may be controlled using a reduced power value described later. During charging of power storage system 1, master management device 50m transmits the calculated system SOPc as an upper limit level of charge power to the controlling circuit of power converter 60. The controlling circuit of power converter 60 divides the system SOPc acquired from master management device 50m by a system voltage and takes the quotient as an upper limit current value to control charging performed by the bidirectional DC/DC converter. During discharging of power storage system 1, master management device 50m transmits the calculated SOPd as an upper limit level of discharge power to the controlling circuit of power converter 60. The controlling circuit of power converter 60 divides the system SOPd acquired from master management device 50m by the system voltage and takes the quotient as an upper limit current value to control discharging performed by the bidirectional DC/DC converter. If power converter 60 has no bidirectional DC/DC converter, the controlling circuit of power converter 60 divides the system SOPc or the system SOPd acquired from master management device 50m by the system voltage and takes the quotient as an upper limit current value to control charging or discharging performed by the bidirectional inverter.

This exemplary embodiment has a circuit configuration in which no DC/DC converter is interposed between power converter 60 and each of power storage racks 10 to 30. Hence, this configuration does not enable control of individual currents flowing through power storage racks 10 to 30. Charge or discharge currents of power converter 60 allocated proportionally according to resistance components of respective power storage racks 10 to 30 flow through power storage racks 10 to 30.

During charging or discharging of power storage system 1 having the configuration described above, at least one of the power storage racks needs to be disconnected in response to occurrence of some instances. Such disconnection is necessary when an abnormality is detected in a particular power storage rack, for example. Specifically, the instances include the occurrence of a communication error in a particular power storage rack and the occurrence of overcurrent, overvoltage, undervoltage, a high-temperature abnormality, or a low-temperature abnormality in a cell in a particular power storage rack although any of the abnormalities is determined to be not urgent. If charge power of a particular power storage rack has exceeded the rack SOPc or if discharge power of a particular power storage rack has exceeded the rack SOPd, the particular power storage rack needs to be disconnected. In response to the occurrence of any of these events, rack managing unit 50 of the power storage rack does not immediately turn off the electromagnetic relay, but transmits a disconnection request signal to master management device 50m.

Disconnection of a particular power storage rack during charging or discharging of power storage system 1 necessitates turning off the electromagnetic relay in the power storage rack through which a current is flowing. Turning off the electromagnetic relay through which a current is flowing contributes to degradation of the electromagnetic relay. General-purpose electromagnetic relays have a polarity and thus have a direction in which the current is readily shut off and a direction in which the current is difficult to be shut off. A high current flowing in the shut-off-difficult direction causes a failure such as welding. A bipolar relay results in high cost.

In response to a disconnection request signal sent from rack managing unit 50 of the particular power storage rack, master management device 50m decreases the upper limit level of charge power or discharge power controlled by power converter 60 from the system SOP to a predetermined reduced power value with proviso that a fall in power is allowed according to an operating status of the system. The reduced power value is not a fixed value but a variable value. Master management device 50m determines the reduced power value based on at least one of an operation mode in which power storage system 1 is put, a record of disconnection, and a manual setting. The master management device turns off the electromagnetic relay without decreasing power if a fall in power is not allowed according to the operating status of the system. In the case of a minor abnormality, the master management device preferably keeps a state of operation of the system without turning off the electromagnetic relay until a fall in power is allowed and turns off the electromagnetic relay at a time when a fall in power is allowed.

The electromagnetic relay decreases in mechanical durability with a rise in number of interruptions and decreases in electrical durability with an increase in degree of the current flowing through the contacts. Comprehensive durability of the electromagnetic relay is specified by a durability curve that is defined by a degree of the contact-flowing current and a number of interruptions. A maximum number of uses increases along with a decrease in the current flowing through the contacts at a time of interruption. The durability curve is defined polarity by polarity.

Master management device 50*m*, for example, sets the reduced power value to a value such that the current flowing through a single electromagnetic relay is less than or equal to 10 A. Influence on the electric durability of even a high-voltage, high-capacity electromagnetic relay is reduced if the contact-flowing current is approximately less than or equal to 10 A. The contact-flowing current may be 0 A. In this case, a current for determining a new system SOP needs to flow after the electromagnetic relay is turned off. If a current of less than or equal to 10 A (≠0 A) flows at a time of turning off the electromagnetic relay, a number of current value change times can be decreased by 1.

If the number of interruptions of the electromagnetic relay approaches the maximum number of uses, master management device 50*m* may set the reduced power value to a value such that the current flowing through the electromagnetic relay gets lower. This reduces the possibility that the electromagnetic relay becomes unusable due to the end of its life before reaching the maximum number of uses.

If the operation mode in which power storage system 1 is put is an autonomous mode and if load 3 is an important load, master management device 50*m* does not change the upper limit level of discharge power controlled by power converter 60. In other words, power converter 60 is not allowed to decrease discharge power. If power storage system 1 is, for example, used as a backup power source for a load that is installed at a medical facility, a communication facility, a data center, or another place and that is not permitted to undergo an instantaneous interruption during a power failure of power system 2, the master management device does not allow power converter 60 to decrease discharge power.

Meanwhile, if the operation mode in which power storage system 1 is put is a system interconnection mode, the master management device decreases the charge power or the discharge power controlled by power converter 60 to the reduced power value. Even if the operation mode in which power storage system 1 is put is the autonomous mode, the master management device decreases the discharge power controlled by power converter 60 to the reduced power value with proviso that load 3 is a load that is permitted to undergo an instantaneous interruption.

Master management device 50*m* can set the reduced power value to a setting value manually set by an administrator or a user. If a manually set setting value exists, the setting value basically takes precedence over other values.

Master management device 50*m* transmits the set reduced power value as an upper limit level of charge/discharge power to the controlling circuit of power converter 60. The controlling circuit of power converter 60 divides the reduced power value acquired from master management device 50*m* by the system voltage and takes the quotient as an upper limit current value to control charging/discharging performed by the bidirectional DC/DC converter.

After the charge/discharge power controlled by power converter 60 is decreased to the reduced power value, master management device 50*m* sends a disconnection command signal to rack managing unit 50 that has sent the disconnection request signal. When receiving the disconnection command signal, rack managing unit 50 turns off the electromagnetic relay in the power storage rack that it manages.

Master management device 50*m* acquires the rack SOP and current values from rack managing units 50 of the remaining power storage racks in power storage system 1 to recalculate the system SOP. Master management device 50*m* transmits the recalculated system SOP as an upper limit level of charge/discharge power to the controlling circuit of power converter 60. The controlling circuit of power converter 60 divides the system SOP acquired from master management device 50*m* by the system voltage and takes the quotient as an upper limit current value to control charging/discharging performed by the bidirectional DC/DC converter.

Figure 2:
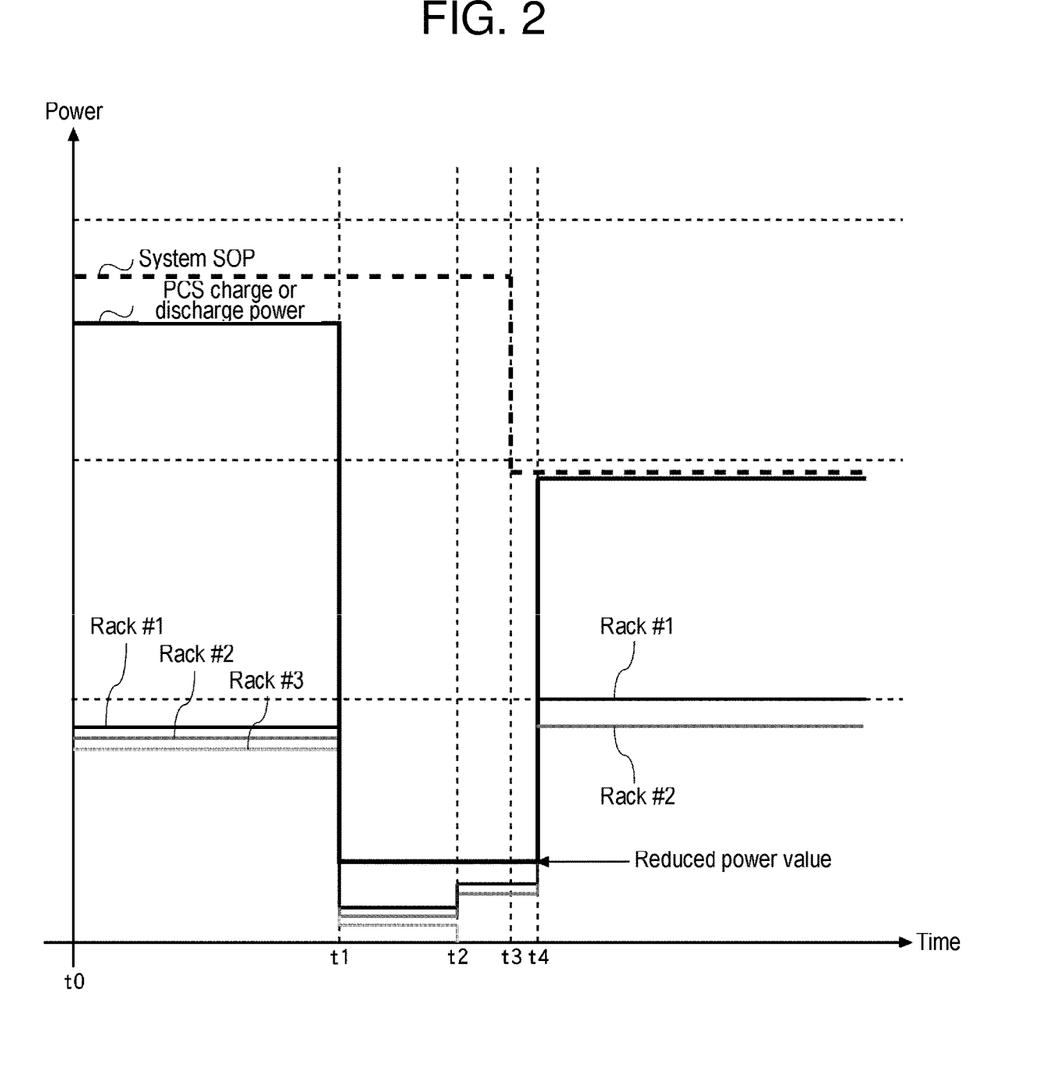
FIG. 2 is a drawing illustrating a specific example of a first example process executed by the power storage system according to the exemplary embodiment of the present invention.

FIG. 2 is a drawing illustrating a specific example of a first example process executed by power storage system 1 according to the exemplary embodiment of the present invention. Between time t0 and time t1, three parallel-connected power storage racks 10 to 30 operate normally. In response to the occurrence of a failure due to an abnormality in third power storage rack 30 at time t1, master management device 50*m* decreases charge or discharge power controlled by power converter 60 to a reduced power value.

At time t2, third power storage rack 30 is disconnected. Between time t2 and time t3, master management device 50*m* calculates a system SOP of two of parallel-connected first and second power storage racks 10 and 20. At time t3, master management device 50*m* transmits the new calculated system SOP to power converter 60. As a result, the system SOP specified for power converter 60 decreases. At time t4, power reduction kept by power converter 60 is removed, and the charge or discharge power controlled by power converter 60 rises to the new system SOP. At and after time t4, two parallel-connected power storage racks 10, 20 operate normally.

Figure 3:
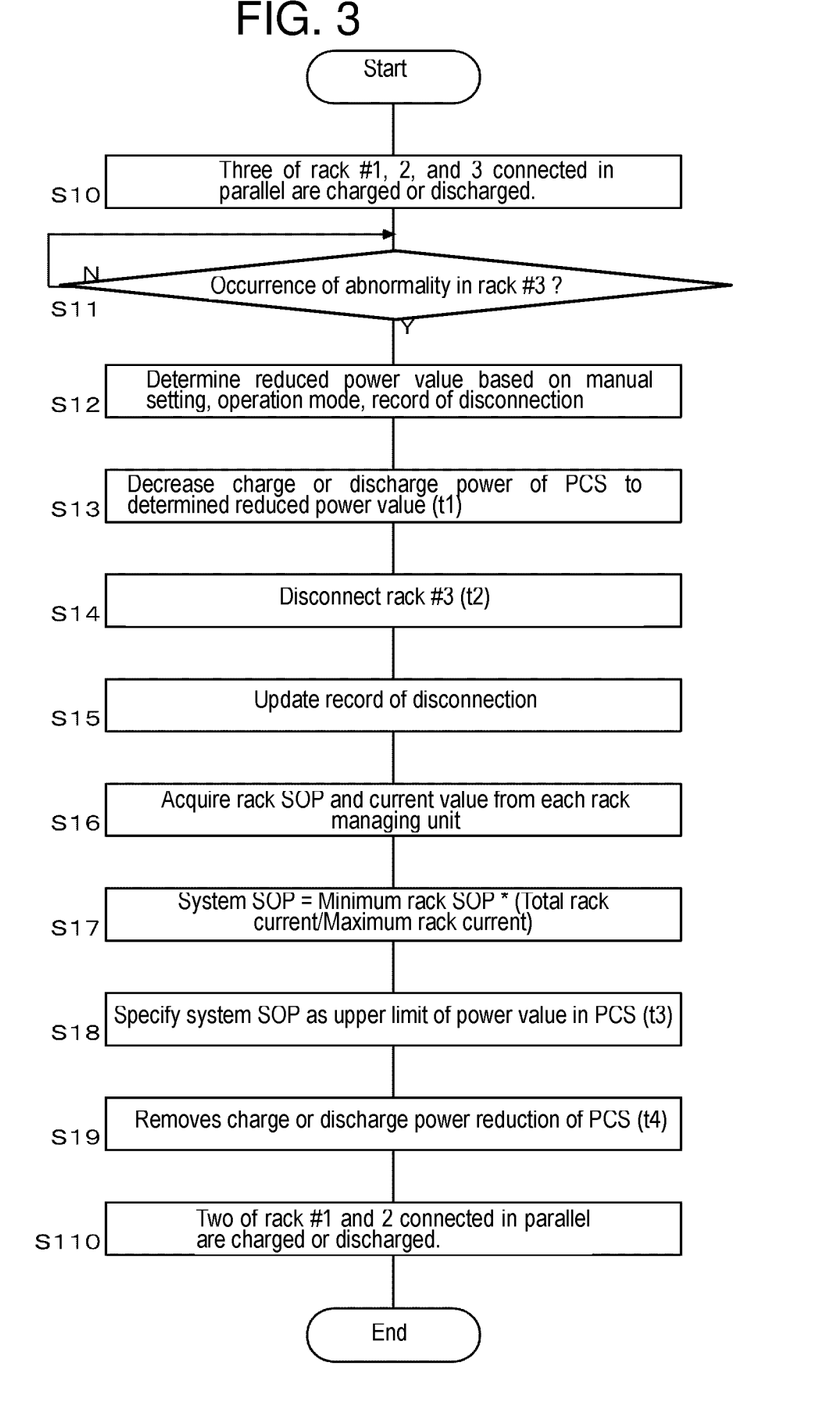
FIG. 3 is a flowchart illustrating a flow of the first example process executed by the power storage system according to the exemplary embodiment of the present invention.

FIG. 3 is a flowchart illustrating a flow of the first example process executed by power storage system 1 according to the exemplary embodiment of the present invention. Power storage system 1 is operating in an operation mode in which three power storage racks 10 to 30 connected in parallel are charged or discharged (S10). In response to the occurrence of a failure due to an abnormality in third power storage rack 30 (Y in S11), master management device 50*m* determines a reduced power value in comprehensive consideration of a manual setting, the operation mode of power storage system 1, and a record of disconnection of the electromagnetic relay (S12). Master management device 50*m* specifies the determined reduced power value for power converter 60, and power converter 60 decreases charge or discharge power to the reduced power value (S13).

Master management device 50*m* transmits a disconnection command signal to third rack managing unit 50*c* of third power storage rack 30, and third rack managing unit 50*c* turns off third switch S3 (electromagnetic relay) to disconnect third power storage rack 30 from power storage system 1 (S14). Third rack managing unit 50*c* transmits a value of and a direction of the current flowing through third switch S3 at the time of turning off to master management device 50*m*. Master management device 50*m* updates the record of disconnection of third switch S3 based on received information about the disconnection of third switch S3 (S15).

Master management device 50*m* acquires the rack SOP and current values from first rack managing unit 50*a* of first power storage rack 10 and second rack managing unit 50*b* of second power storage rack 20 (S16). The master management device acquires the rack SOP and current values periodically (e.g., once in one minute, once in five minutes). At the time of disconnection of a power storage rack, rack SOP and current values of the remaining power storage racks are immediately acquired.

Master management device 50*m* calculates a new system SOP of two parallel-connected first and second power storage racks 10 and 20 based on the rack SOP and current values acquired from the power storage racks (S17). Master management device 50*m* specifies or sets the new calculated system SOP of the two parallel-connected racks for power converter 60 (S18). After updating the system SOP, power converter 60 removes charge or discharge power reduction (S19). When the reduction is removed, power storage system 1 operates in an operation mode in which two power storage racks 10, 20 connected in parallel are charged or discharged (S110).

Reversal of the sequence of system SOP updating and reduction removal entails a risk that the charge or discharge power after reduction removal exceeds the new system SOP. If the charge or discharge power controlled by power converter 60 is not reduced prior to disconnection of third power storage rack 30, there is a risk that the charge or discharge power controlled by power converter 60 exceeds the new system SOP of the two parallel-connected racks on the instant that third power storage rack 30 is disconnected.

Figure 4:
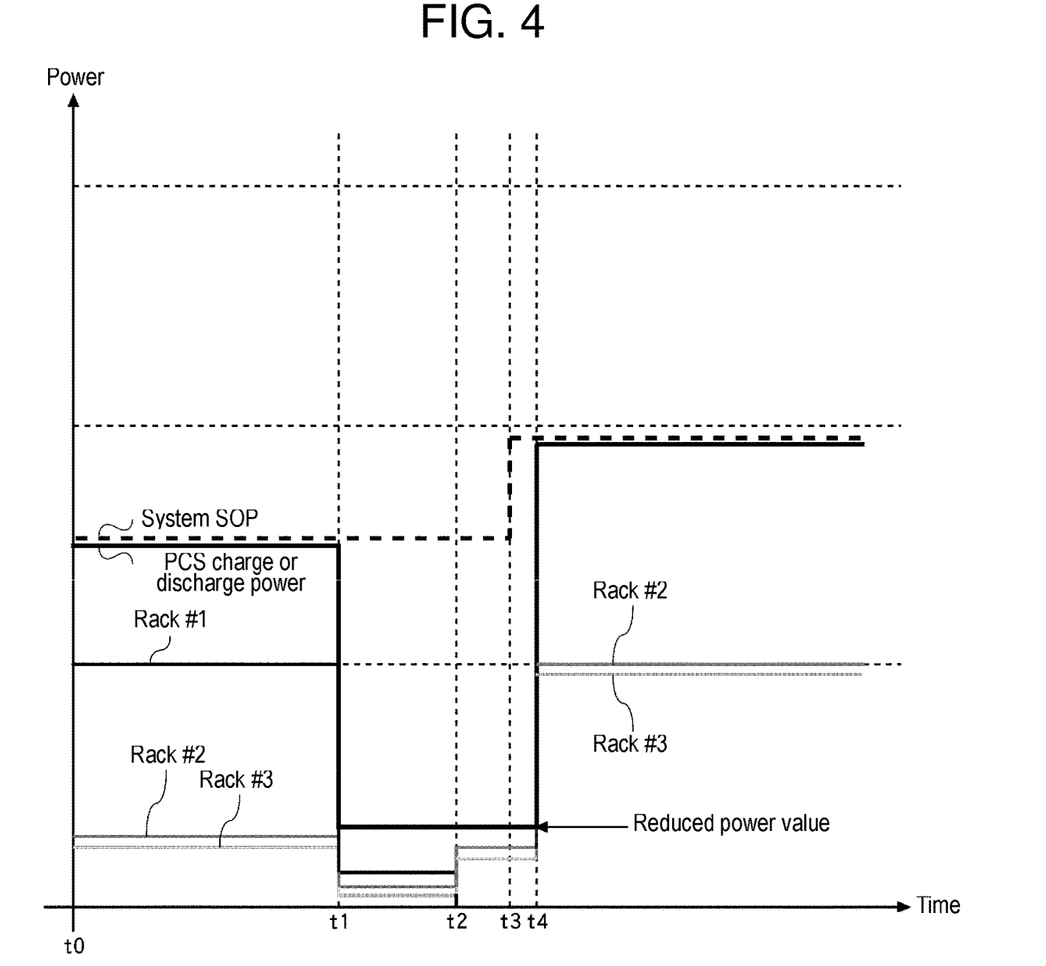
FIG. 4 is a drawing illustrating a specific example of a second example process executed by the power storage system according to the exemplary embodiment of the present invention.

FIG. 4 is a drawing illustrating a specific example of a second example process executed by power storage system 1 according to the exemplary embodiment of the present invention. If the deviation in current among power storage racks is large, disconnection of a particular power storage rack increases the system SOP in some cases. The second example process illustrated involves intentionally disconnecting a particular power storage rack to increase the system SOP.

Between time t0 and time t1, three parallel-connected power storage racks 10 to 30 operate normally. Of the charge or discharge current controlled by power converter 60, a conspicuously large amount of the current is flowing through first power storage rack 10. The system SOP in this situation is very lowered as compared with that in FIG. 2. At time t1, the master management device starts action for disconnecting first power storage rack 10. Master management device 50*m* decreases charge or discharge power controlled by power converter 60 to a reduced power value.

At time t2, first power storage rack 10 is disconnected. Between time t2 and time t3, master management device 50*m* calculates a system SOP of two parallel-connected second and third power storage racks 20 and 30. At time t3, master management device 50*m* transmits the new calculated system SOP to power converter 60. At time t4, power reduction kept by power converter 60 is removed, and the charge or discharge power controlled by power converter 60 rises to the new system SOP. The new system SOP is a value higher than the system SOP before updating. The charge or discharge power controlled by power converter 60 gets larger than the charge or discharge power controlled before the disconnection of first power storage rack 10. At and after time t4, two parallel-connected power storage racks 20, 30 operate normally.

Figure 5:
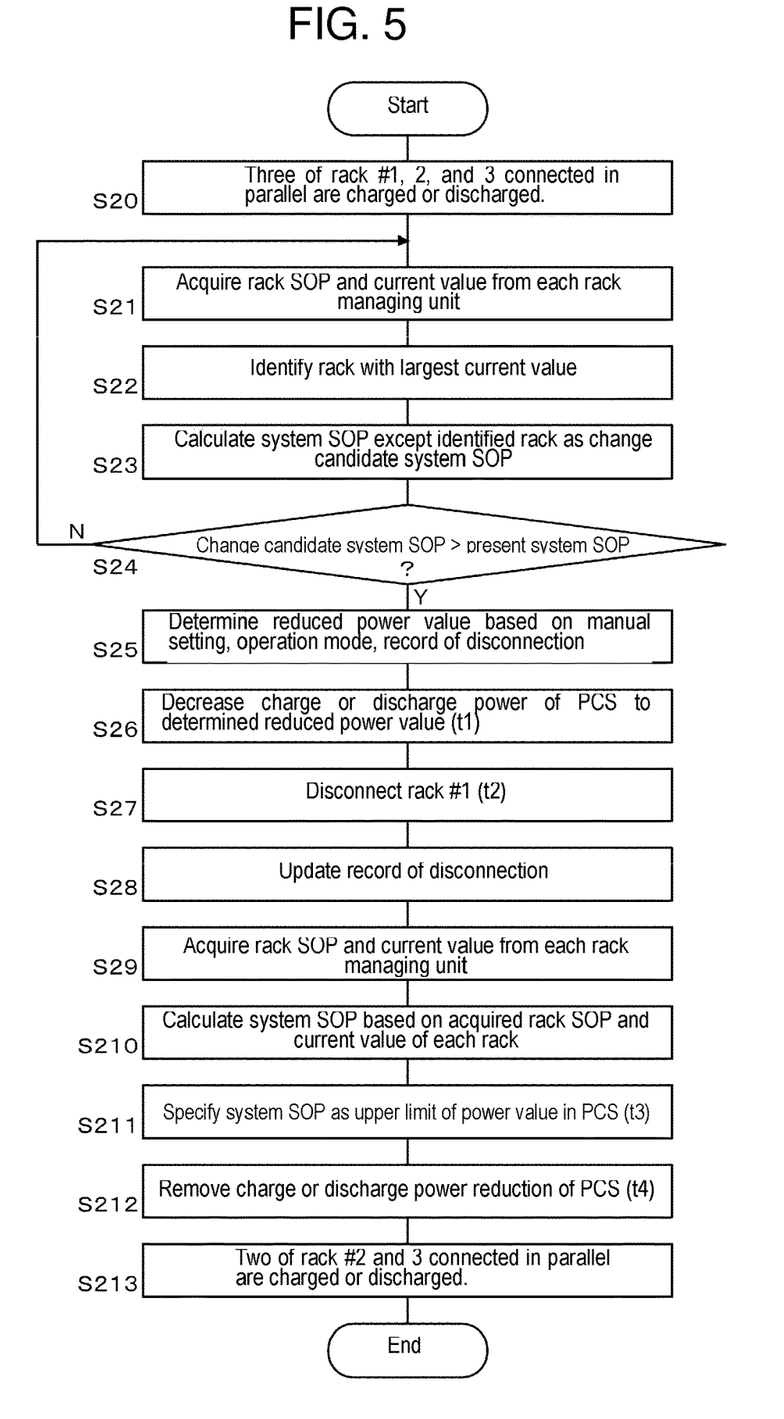
FIG. 5 is a flowchart illustrating a flow of the second example process executed by the power storage system according to the exemplary embodiment of the present invention.

FIG. 5 is a flowchart illustrating a flow of the second example process executed by power storage system 1 according to the exemplary embodiment of the present invention. Power storage system 1 is operating in an operation mode in which three power storage racks 10 to 30 connected in parallel are charged or discharged (S20). Master management device 50*m* periodically acquires rack SOP and current values from first rack managing unit 50*a* of first power storage rack 10, second rack managing unit 50*b* of second power storage rack 20, and third rack managing unit 50*c* of third power storage rack 30 (S21). Master management device 50*m* identifies a power storage rack with a largest current value (first power storage rack 10 in this specific example) (S22). Master management device 50*m* calculates a system SOP of the two power storage racks except the identified power storage rack and takes the calculated system SOP as a change candidate system SOP (S23).

Master management device 50*m* compares the calculated change candidate system SOP with the present system SOP specified for power converter 60 (S24). If the change candidate system SOP is less than or equal to the present system SOP (N in S24), the master management device transitions to step S21. If the change candidate system SOP is greater than the present system SOP (Y in S24), master management device 50*m* determines a reduced power value in comprehensive consideration of a manual setting, the operation mode of power storage system 1, and a record of disconnection of the electromagnetic relay (S25). Master management device 50*m* specifies the determined reduced power value for power converter 60, and power converter 60 decreases charge or discharge power to the reduced power value (S26).

Master management device 50*m* transmits a disconnection command signal to first rack managing unit 50*a* of first power storage rack 10, and first rack managing unit 50*a* turns off first switch S1 (electromagnetic relay) to disconnect first power storage rack 10 from power storage system 1 (S27). First rack managing unit 50*a* transmits a value of and a direction of the current flowing through first switch S1 at the time of turning off to master management device 50*m*. Master management device 50*m* updates the record of disconnection of first switch S1 based on received information about the disconnection of first switch S1 (S28).

Master management device 50*m* acquires rack SOP and current values from second rack managing unit 50*b* of second power storage rack 20 and third rack managing unit 50*c* of third power storage rack 30 (S29). Master management device 50*m* calculates a new system SOP of two parallel-connected second and third power storage racks 20 and 30 based on the rack SOP and current values acquired from the power storage racks (S210). Master management device 50*m* specifies the new calculated system SOP of the two parallel-connected racks for power converter 60 (S211). After updating the system SOP, power converter 60 removes charge or discharge power reduction (S212). When the reduction is removed, power storage system 1 operates in an operation mode in which two power storage racks 20, 30 connected in parallel are charged or discharged (S213).

According to the present exemplary embodiment described above, when at least one of the plurality of power storage racks is disconnected, the power storage system calculates a new system SOP by taking into account the number of the remaining power storage racks connected in parallel as well as the deviation in current between the remaining power storage racks. This enables the power storage system to continue stable operation without letting the power of each power storage rack exceed the rack SOP. In contrast, if the new system SOP is calculated based only on the number of the parallel-connected remaining power storage racks, a large deviation in current between the power storage racks can cause any of the power storage racks to have a power level that exceeds the rack SOP.

The master management device decreases the charge or discharge power controlled by power converter 60 prior to disconnection. This helps prolong the life of the relay. Even if a general-purpose inexpensive relay having a polarity is used in the rack, safe disconnection of the rack is possible. If the deviation in current between the power storage racks gets larger, the master management device is able to increase the system SOP by intentionally disconnecting the particular power storage rack (specifically, the power storage rack with a largest current value).

The present invention has been described with reference to the exemplary embodiment. Those skilled in the art will comprehend that the exemplary embodiment is an example, the combinations of the constituent elements and the processing steps can be modified in various ways, but nevertheless such modifications are included in the scope of the present invention.

The second example process described above involves intentionally disconnecting one of the three parallel-connected power storage racks to improve the system SOP, for example. In this regard, if the number of power storage racks connected in parallel is large, disconnection of two or more power storage racks increases the system SOP in some cases. For instance, one power storage rack after another with the largest current value is disconnected until the change candidate system SOP gets less than or equal to the present system SOP. The algorithm used to identify a power storage rack that is to be disconnected may be any algorithm other than that shown in FIG. 5. For instance, a master management device may calculate a change candidate system SOP that is determined if two power storage racks with first and second largest current values are disconnected and may simultaneously disconnect the two power storage racks with the first and second largest current values if the calculated change candidate system SOP is greater than the present system SOP.

In the exemplary embodiment described above, master management device 50*m* is disposed outside rack managing units 50*a* to 50*c*. However, the master management device may be disposed in any of rack managing units 50*a* to 50*c*.

The exemplary embodiment may be specified by the following items.

[Item 1]

Power storage system (1) including: a plurality of power storage blocks (10 to 30) connected in parallel; power converter (60) converting direct current (DC) power discharged from the plurality of power storage blocks (10 to 30) into alternating current (AC) power to output the AC power to power system (2) or load (3) and converting AC power sent from power system (2) into DC power to charge the plurality of power storage blocks (10 to 30); a plurality of switches (S1 to S3) interposed between the plurality of respective power storage blocks (10 to 30) and power converter (60); and management device (50*m*) calculating a state of power (SOP) of a whole of the plurality of power storage blocks (10 to 30) based on an SOP of each of the plurality of power storage blocks (10 to 30) to specify the calculated SOP of the whole for an upper limit level of power or current for at least one of charging and discharging controlled by power converter (60), in which when at least one of the plurality of switches (S1 to S3) is turned off to disconnect at least one (30) of the plurality of power storage blocks (10 to 30), management device (50*m*) calculates an SOP of a whole of remaining power storage blocks (10, 20) based on a deviation in current between each of remaining power storage blocks (10, 20) to determine an upper limit level of power or current flowing into power converter (60).

This configuration enables the power storage system to continue stable operation even if at least one (30) of the plurality of power storage blocks (10 to 30) connected in parallel is disconnected from the system.

[Item 2]

Power storage system (1) according to item 1, in which management device (50*m*) calculates the SOP of the whole of remaining power storage blocks (10, 20) by dividing a total of values of currents flowing through respective remaining power storage blocks (10, 20) by a largest value of the values of the currents to determine a quotient and multiplying a minimum value of values of the SOP of each of remaining power storage blocks (10, 20) by the quotient.

This allows the management device to factor in a deviation in current between each of remaining power storage blocks (10, 20) in calculating the SOP of the whole of remaining power storage blocks (10, 20).

[Item 3]

Power storage system (1) according to either item 1 or 2, in which management device (50*m*) decreases the upper limit level of power or current flowing into power converter (60) to a predetermined power value or a current value and subsequently turns off at least one switch (S3) connected to at least one power storage block (30) to disconnect at least one (30) of the plurality of power storage blocks (10 to 30).

This reduces stress put on switch (S3) and helps prolong the life of switch (S3).

[Item 4]

Power storage system (1) according to item 3, in which the predetermined power value is a variable value, and management device (50*m*) determines the predetermined power value by reference to at least one of an operation mode in which power storage system (1) is put, a record of a number of actions of switch (S3), and a setting value set manually.

This allows the management device to flexibly determine the predetermined power value according to the situation.

[Item 5]

Power storage system (1) according to any one of items 1 to 4, in which management device (50*m*) omits power storage block (10) with a largest current among currents flowing through the plurality of respective power storage blocks (10 to 30) to calculate an SOP of a whole of remaining power storage blocks (20, 30) and turns off switch (S1) connected to power storage block (10) with the largest current on condition that the calculated SOP is greater than the SOP of the whole of the plurality of power storage blocks (10 to 30) at present.

This allows the management device to increase the SOP of the whole of the plurality of remaining power storage blocks (20, 30) by intentionally disconnecting power storage block (10) with the largest current.

[Item 6]

Power storage system (1) including: a plurality of power storage blocks (10 to 30) connected in parallel; power converter (60) converting direct current (DC) power discharged from the plurality of power storage blocks (10 to 30) into alternating current (AC) power to output the AC power to power system (2) or load (3) and converting AC power sent from power system (2) into DC power to charge the plurality of power storage blocks (10 to 30); a plurality of switches (S1 to S3) interposed between the plurality of respective power storage blocks (10 to 30) and power converter (60); and management device (50m) configured to decrease an upper limit level of power or current for at least one of charging and discharging controlled by power converter (60) to a predetermined power value or a current value and subsequently turn off at least one switch (S3) connected to at least one power storage block (30) in response to occurrence of an event that requires at least one (30) of the plurality of power storage blocks (10 to 30) to be disconnected.

This reduces stress put on switch (S3) and helps prolong the life of switch (S3).

[Item 7]

Management device (50m) connected to power storage system (1) that includes: a plurality of power storage blocks (10 to 30) connected in parallel; power converter (60) converting direct current (DC) power discharged from the plurality of power storage blocks (10 to 30) into alternating current (AC) power to output the AC power to power system (2) or load (3) and converting AC power sent from power system (2) into DC power to charge the plurality of power storage blocks (10 to 30); and a plurality of switches (S1 to S3) interposed between the plurality of respective power storage blocks (10 to 30) and power converter (60), in which management device (50m) calculates a state of power (SOP) of a whole of the plurality of power storage blocks (10 to 30) based on an SOP of each of the plurality of power storage blocks (10 to 30) to specify the calculated SOP of the whole for an upper limit level of power or current for at least one of charging and discharging controlled by power converter (60), and when at least one (S3) of the plurality of switches (S1 to S3) is turned off to disconnect at least one (30) of the plurality of power storage blocks (10 to 30), management device (50m) calculates an SOP of a whole of remaining power storage blocks (10, 20) based on a deviation in current between each of remaining power storage blocks (10, 20) to determine an upper limit level of power or current flowing into power converter (60).

This configuration enables the power storage system to continue stable operation even if at least one (30) of the plurality of power storage blocks (10 to 30) connected in parallel is disconnected from the system.

The invention claimed is:

1. A power storage system comprising:
a plurality of power storage blocks connected in parallel;
a power converter converting direct current (DC) power discharged from the plurality of the power storage blocks into alternating current (AC) power to output the AC power to a power system or a load and converting AC power sent from the power system into DC power to charge the plurality of the power storage blocks;
a plurality of switches interposed between the plurality of respective power storage blocks and the power converter; and
a management device calculating a state of power (SOP) of a whole of the plurality of power storage blocks based on an SOP of each of the plurality of the power storage blocks to specify the calculated SOP of the whole for an upper limit level of power or current for at least one of charging and discharging controlled by the power converter,
wherein when at least one of the plurality of the switches is turned off to disconnect at least one of the plurality of power storage blocks, the management device calculates an SOP of a whole of the remaining power storage blocks based on a deviation in current between each of the remaining power storage blocks to determine an upper limit level of power or current flowing into the power converter.

2. The power storage system according to claim 1, wherein the management device calculates the SOP of the whole of the remaining power storage blocks by dividing a total of values of currents flowing through the respective remaining power storage blocks by a largest value of the values of the currents to determine a quotient and multiplying a minimum value of values of the SOP of each of the remaining power storage blocks by the quotient.

3. The power storage system according to claim 1, wherein the management device decreases the upper limit level of power or current flowing into the power converter to a predetermined power value or a current value and subsequently turns off at least one of the switches connected to the at least one of the power storage blocks to disconnect at least one of the plurality of power storage blocks.

4. The power storage system according to claim 3, wherein
the predetermined power value is a variable value, and
the management device determines the predetermined power value by reference to at least one of an operation mode in which the power storage system is put, a record of a number of actions of the switch, and a setting value set manually.

5. The power storage system according to claim 1, wherein the management device calculates, without one of the power storage blocks with a largest current among currents flowing through the plurality of respective power storage blocks, an SOP of a whole of the remaining power storage blocks, and turns off the switch connected to the power storage block with the largest current on condition that the calculated SOP is greater than the SOP of the whole of the plurality of power storage blocks at present.

6. A power storage system comprising:
a plurality of power storage blocks connected in parallel;
a power converter converting direct current (DC) power discharged from the plurality of power storage blocks into alternating current (AC) power to output the AC power to a power system or a load and converting AC power sent from the power system into DC power to charge the plurality of power storage blocks;
a plurality of switches interposed between the plurality of respective power storage blocks and the power converter; and
a management device configured to decrease an upper limit level of power or current for at least one of charging and discharging controlled by the power converter to a predetermined power value or a current value and subsequently turn off at least one of the switches connected to at least one of the power storage blocks in response to occurrence of an event that requires the at least one of the power storage blocks to be disconnected.

7. A management device connected to a power storage system that includes:
a plurality of power storage blocks connected in parallel;
a power converter converting direct current (DC) power discharged from the plurality of the power storage blocks into alternating current (AC) power to output the AC power to a power system or a load and converting AC power sent from the power system into DC power to charge the plurality of the power storage blocks; and a plurality of switches interposed between the plurality of respective power storage blocks and the power converter, wherein the management device calculates a state of power (SOP) of a whole of the plurality of power storage blocks based on an SOP of each of the plurality of power storage blocks to specify the calculated SOP of the whole for an upper limit level of power or current for at least one of charging and discharging controlled by the power converter, and when at least one of the plurality of switches is turned off to disconnect at least one of the plurality of power storage blocks, the management device calculates an SOP of a whole of the remaining power storage blocks based on a deviation in current between each of the remaining power storage blocks to determine an upper limit level of power or current flowing into the power converter.

* * * * *